United States Patent [19]
Yamaguchi

[11] Patent Number: 5,515,746
[45] Date of Patent: May 14, 1996

[54] TRAVELING DRIVING DEVICE FOR A BICYCLE

[76] Inventor: Kiyoshi Yamaguchi, 22-26, Showa-cho, Atami-shi, Shizuoka-ken, Japan

[21] Appl. No.: 350,959

[22] Filed: Dec. 7, 1994

[30] Foreign Application Priority Data

Dec. 16, 1993 [JP] Japan .................................. 5-342823

[51] Int. Cl.⁶ ...................................................... G05G 1/14
[52] U.S. Cl. .............................. 74/594.2; 74/68; 74/594.1
[58] Field of Search ............................ 74/63, 68, 594.1, 74/594.2, 594.3

[56] References Cited

U.S. PATENT DOCUMENTS

| | | | |
|---|---|---|---|
| 657,859 | 9/1900 | Cottrell | 74/594.2 |
| 4,164,153 | 8/1979 | Moritsch et al. | 74/594.1 |
| 4,816,009 | 3/1989 | Philipp | 74/594.1 |

FOREIGN PATENT DOCUMENTS 325640  10/1902  France .

*Primary Examiner*—Rodney H. Bonck
*Assistant Examiner*—Chong H. Kim
*Attorney, Agent, or Firm*—Flynn, Thiel, Boutell & Tanis

[57] ABSTRACT

A traveling driving device for a bicycle, which device is capable of increasing rotational torque of a chain wheel using pedaling cranks without elongating a crank arm. This device is borne by a bearing disposed on a frame of the bicycle and has an eccentric plate put on a rotating shaft having cranks with pedal. This eccentric plate is secured to a frame member of the bicycle through a stay portion. The chain wheel is put rotatably on the outer periphery of the eccentric plate through a ball bearing and a working plate secured to the rotating shaft is linked to the chain wheel by linking members. When the rotating shaft is rotated by pedaling action of the cranks, rotation is transmitted to the chain wheel through the working plate and the linking members. Since the chain wheel is rotated in an eccentric state with respect to the rotating shaft, it can be rotated with a rotation radius smaller than a chain wheel having no eccentric mechanism and as a result, rotational torque of the chain wheel is increased, depending on eccentricity length.

6 Claims, 5 Drawing Sheets

TRAVELING DRIVING DEVICE FOR A BICYCLE

FIELD OF THE INVENTION

The present invention relates to an improvement of a traveling driving device for a bicycle.

BACKGROUND OF THE INVENTION

Conventionally a traveling driving device for a bicycle has a mechanism, in which a chain wheel is rotated by pedaling action through a gear crank and rotation of the chain wheel is transmitted to a rear wheel through a chain.

In the traveling driving device constructed as described above, it is one of the simplest ways to elongate the arm of the gear crank in order to intend increase of torque of the rotation by the pedaling action. However, since the most appropriate length of the arm of the gear crank is determined from points of view of the human engineering and the construction of the driving mechanism, if it is too long, the pedaling action is difficult so that it is not practicable.

OBJECT OF THE INVENTION

The main object of the present invention is to provide a traveling driving device for a bicycle, in which rotational torque of the chain wheel by pedaling action can be increased without elongating the arm of the gear crank.

SUMMARY OF THE INVENTION

In order to achieve the above object, a traveling driving device for a bicycle according to the present invention comprises a rotating shaft mounted on a bearing portion disposed on a frame of the bicycle; cranks with pedal mounted on two extremities of the rotating shaft; an eccentric plate inserted between one of the cranks and the bearing portion to be mounted eccentrically with respect to said rotating shaft and secured to the frame; a chain wheel mounted rotatably on the outer periphery of the eccentric plate; and a working plate secured to the rotating shaft between the one of the cranks and the eccentric plate and linked with the chain wheel through a linking mechanism.

In the construction as described above, when the rotating shaft is rotated by pedaling action of the cranks, rotation of the rotating shaft is transmitted to the chain wheel through the working plate and linking members. As the result of the fact that the chain wheel is rotated in an eccentric manner through the eccentric plate with respect to the rotating shaft, since the chain wheel is driven rotationally with a rotation radius smaller than a chain wheel having no eccentric mechanism, when pedaling force acting on the cranks is constant, the rotational torque of the chain wheel rotating eccentrically as described previously is increased with increasing effective eccentricity length.

DETAILED DESCRIPTION

Figure 1:
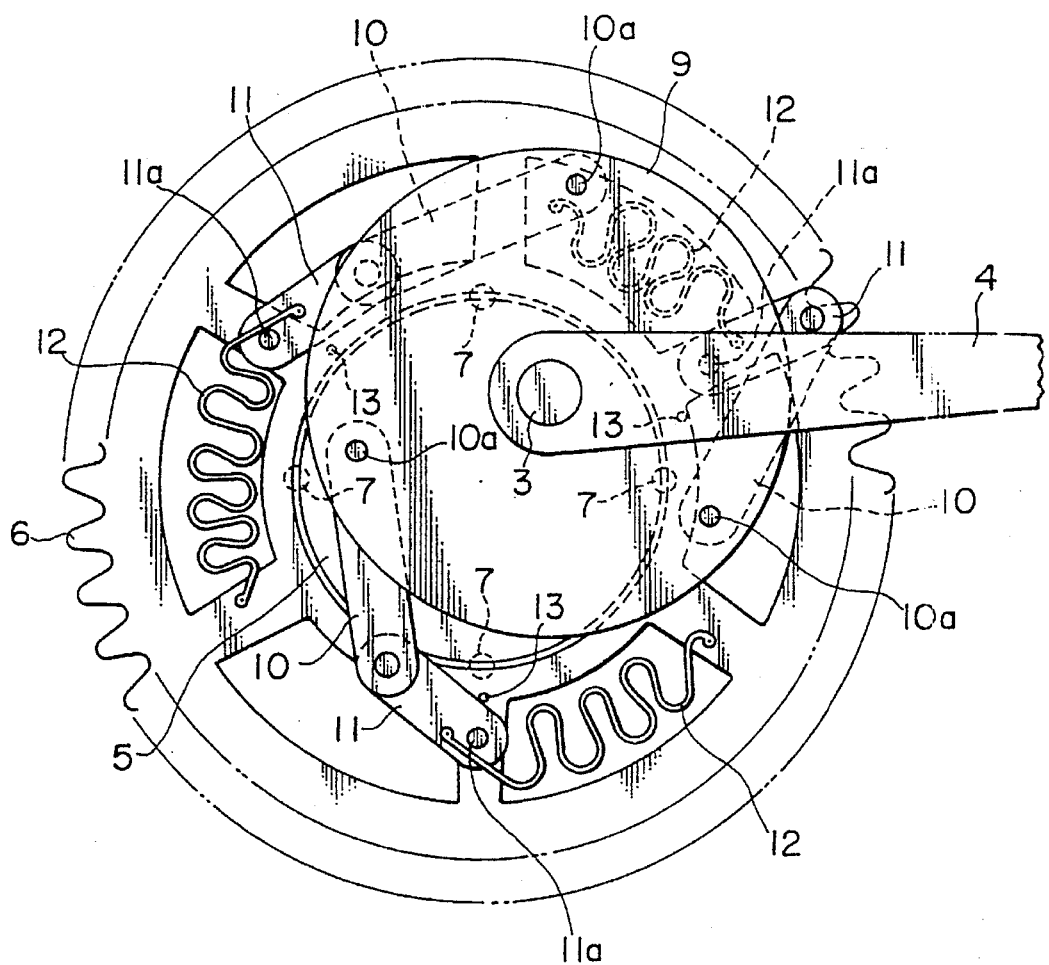
FIG. 1 is a plan view of the principal part of a traveling driving device for a bicycle, which is a first embodiment of the present invention.
Figure 2:
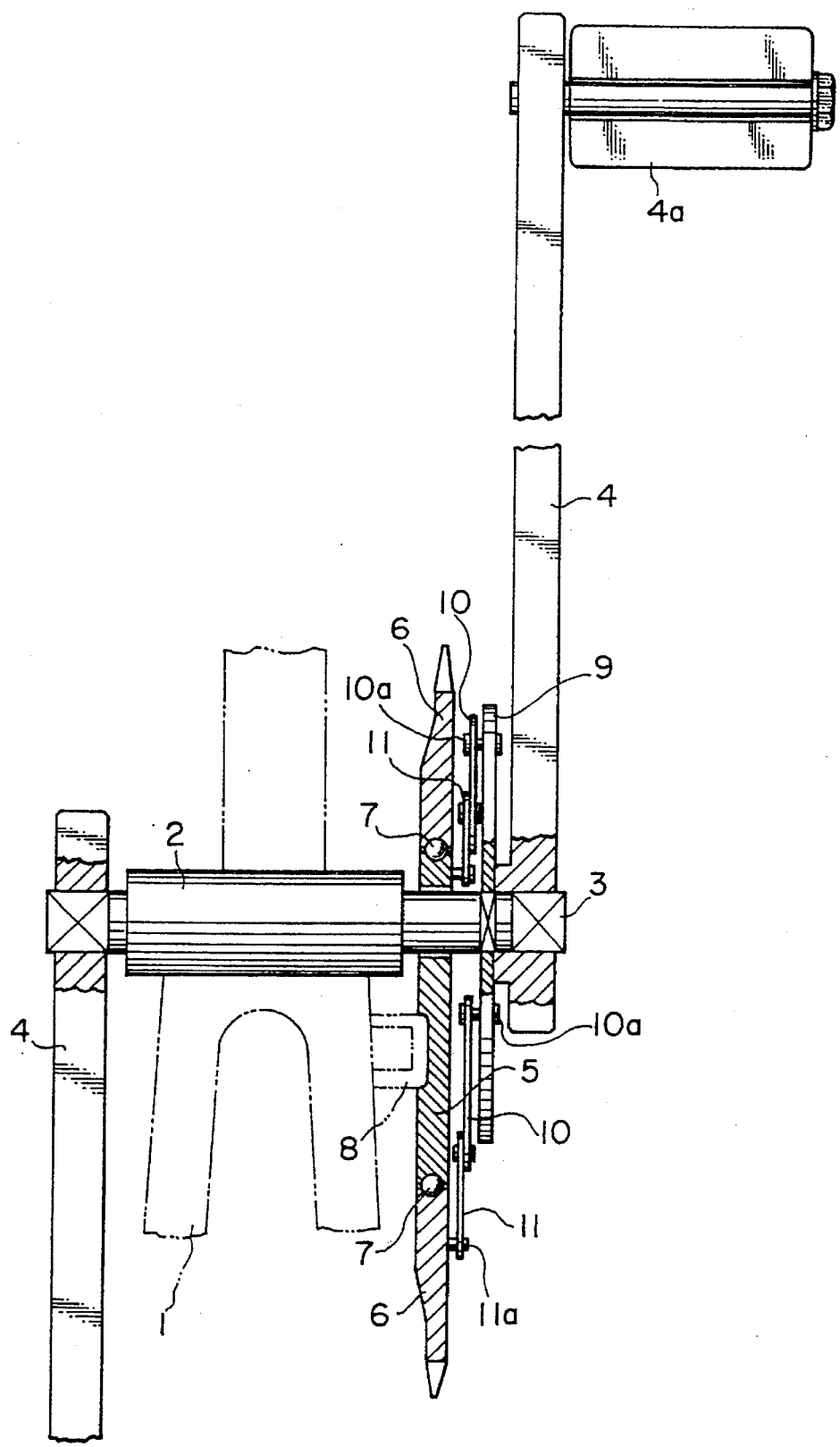
FIG. 2 is a cross-sectional view of the device indicated in FIG. 1.

FIGS. 1 and 2 show a first embodiment of the present invention.

In FIGS. 1 and 2, reference numeral 1 is a frame member for a front wheel of a usual bicycle; 2 is a bearing; 3 is a rotating shaft; 4 is a pair of cranks with pedal linked with the rotating shaft; and 4a is a pedal (only one of the pedals being indicated). An eccentric plate 5 is put on the rotating shaft 5 and on the outer periphery of this eccentric plate 5 there is disposed a chain wheel 6 rotatably through a ball bearing 7. A chain (not shown) is passed round the chain wheel to drive a rear wheel. The eccentric plate 5 is secured to the frame member 1 through a stay member 8 to be held. A working plate 9 is put around the rotating shaft to be secured thereto. This working plate 9 and the chain wheel 6 are linked with each other by a linking mechanism constituted by three sets of link arms disposed in the circumferential direction and each of the link arms is constructed by pin linkage type linking members 10 and 11. 10a is a supporting pin on the working plate 9 side, while 11a is a supporting pin on the chain wheel side. 12 is a zigzag shaped spring bridged between one of the linking members 11 and the chain wheel 6 in order to limit linking movement of the pin linkage type linking members 10 and 11 to only one predetermined direction from a dead point in the linking angle of the two members. Further there is disposed a stopper pin 13 on the chain wheel, which is engaged with the linking member 11. Similarly to the spring, this is disposed in order to limit linking movement of the pin linkage type linking members 10 and 11 to only one predetermined direction from a dead point in the linking angle of the two members. In this case, either one of the stopper pin 13 and the spring 12 may be used, but it is more advantageous to use both of them for the movement of the linking members. However the spring and the stopper pin are not always necessary.

In the construction as described above, when the rotating shaft 3 is rotated by pedaling action of the cranks with pedal, the rotation thus obtained is transmitted to the chain wheel 6 through the working plate 9 and the three sets of pin linkage type linking members 10 and 11. The chain wheel 6 is rotated in an eccentric manner with respect to the rotating shaft 3. As a result, since the chain wheel is driven rotationally with a rotation radius smaller than a chain wheel having no eccentric mechanism, when pedaling force acting on the cranks is constant, the rotational torque of the chain wheel rotated eccentrically is increased with increasing eccentric effective length.

Figure 3:
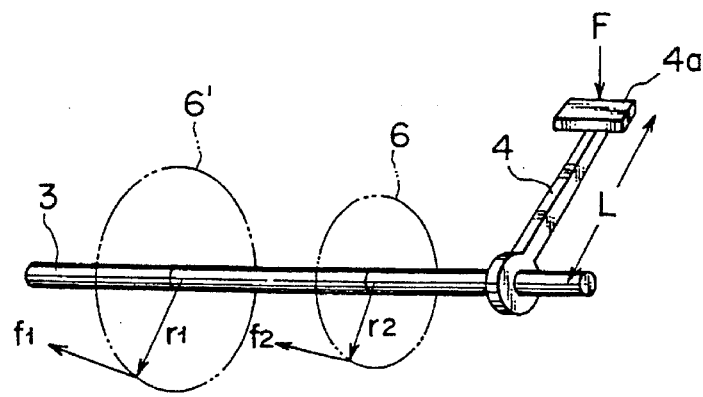
FIG. 3 is a diagram for explaining increase of rotational torque of a chain wheel.

FIG. 3 is a diagram for explaining the increase of the rotational torque, as described above. In the FIG. 3 is the rotating shaft; 4 is a crank; 4a is a pedal; 6 is the chain wheel rotating in an eccentric manner; and 6' is a chain wheel rotating in a not eccentric manner. Here F denotes a pedaling force acting on the crank pedal; $r_1$ a rotational effective radius of the not eccentric chain wheel 6'; $f_1$ is a rotational torque of the chain wheel; $r_2$ is a rotational effective radius of the eccentric chain wheel 6; and $f_2$ the rotational torque thereof.

In case where F=50 kg, $r_1$=65 mm, $r_2$=89 mm and L=165 mm, $f_1$=F·165/89=50×165÷89=92.7 (kg)

$f_2$=F·165/65=50×165÷65=126.9 (kg)

$f_2/f_1$=126.9/92.7=1.369

As indicated in the above equations, by using the traveling driving device thus constructed for a bicycle it is possible to increase the rotational torque of the chain wheel due to the pedaling force about 1.4 times. In reality, there is friction loss at the bearing, etc., but even taking it into account, it is possible to obtain an increase of about 30% in the torque with respect to a conventional bicycle.

Figure 4:
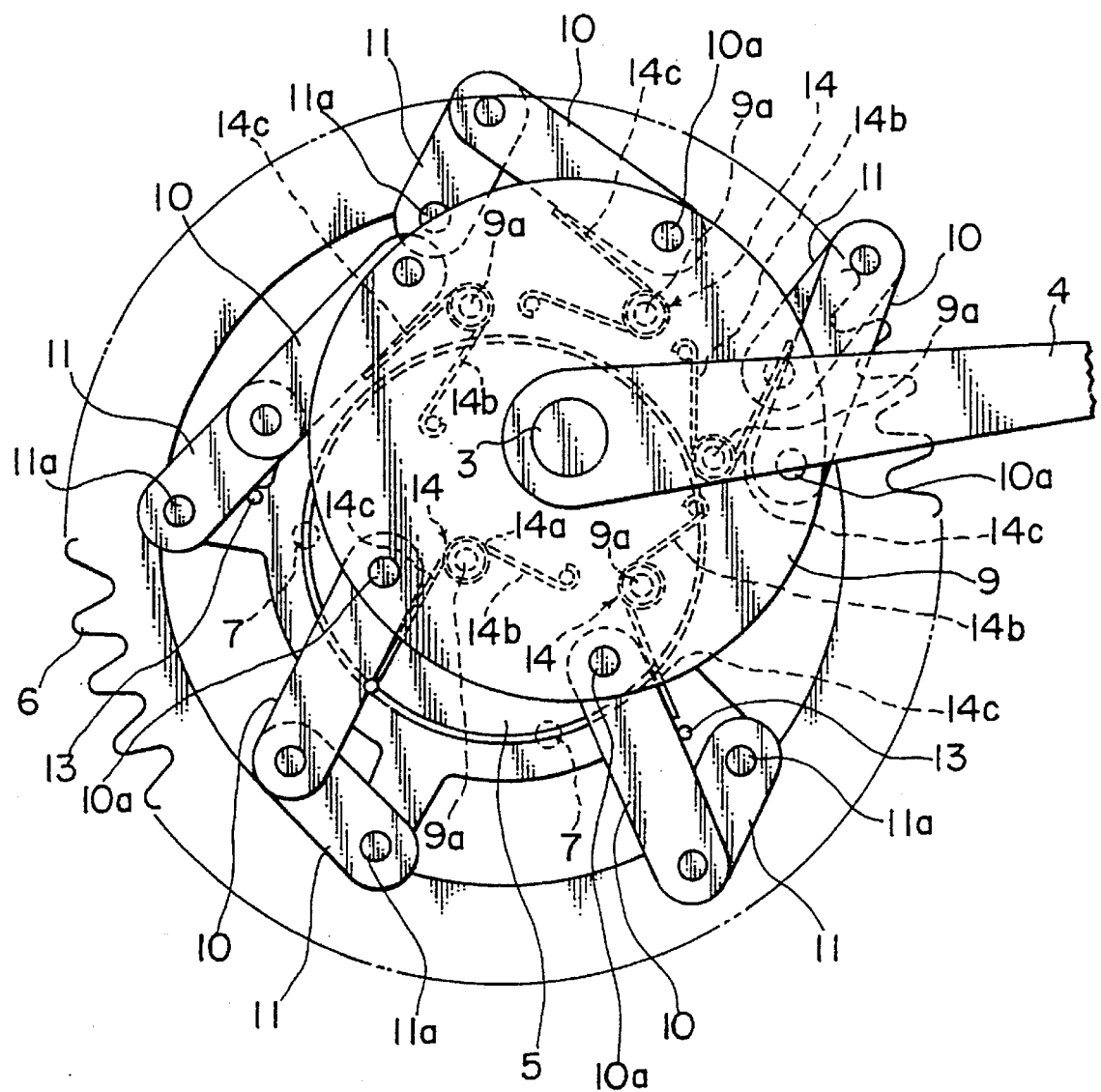
FIG. 4 is a plan view of the principal part of a traveling driving device for a bicycle, which is a second embodiment of the present invention.

FIG. 4 shows a second embodiment of the present invention.

The present embodiment is so constructed that rotation of the working plate 9 is transmitted by using five sets of pin linkage type linking members 10 and 11. Roll-up type springs 14 are used for the same purpose as the springs 12 in the first embodiment. The roll-up portion 14a of each of these roll-up type springs 14 is supported by a pin 9a on the working plate 9. One 14b of the arm portions is linked on the chain wheel 6 side and the other arm portion 14c is hooked on a side edge of the linking member 10. The reason why the roll-up type springs 14 are used is that mounting is easier, even if the number of pin linkage type linking members increases.

Rotation transmitting force to the chain wheel is increased by increasing the number of points of application when rotation of the working plate 9 is transmitted to the chain wheel 6, as described above, so that smoothness of the rotation is improved.

Figure 5:
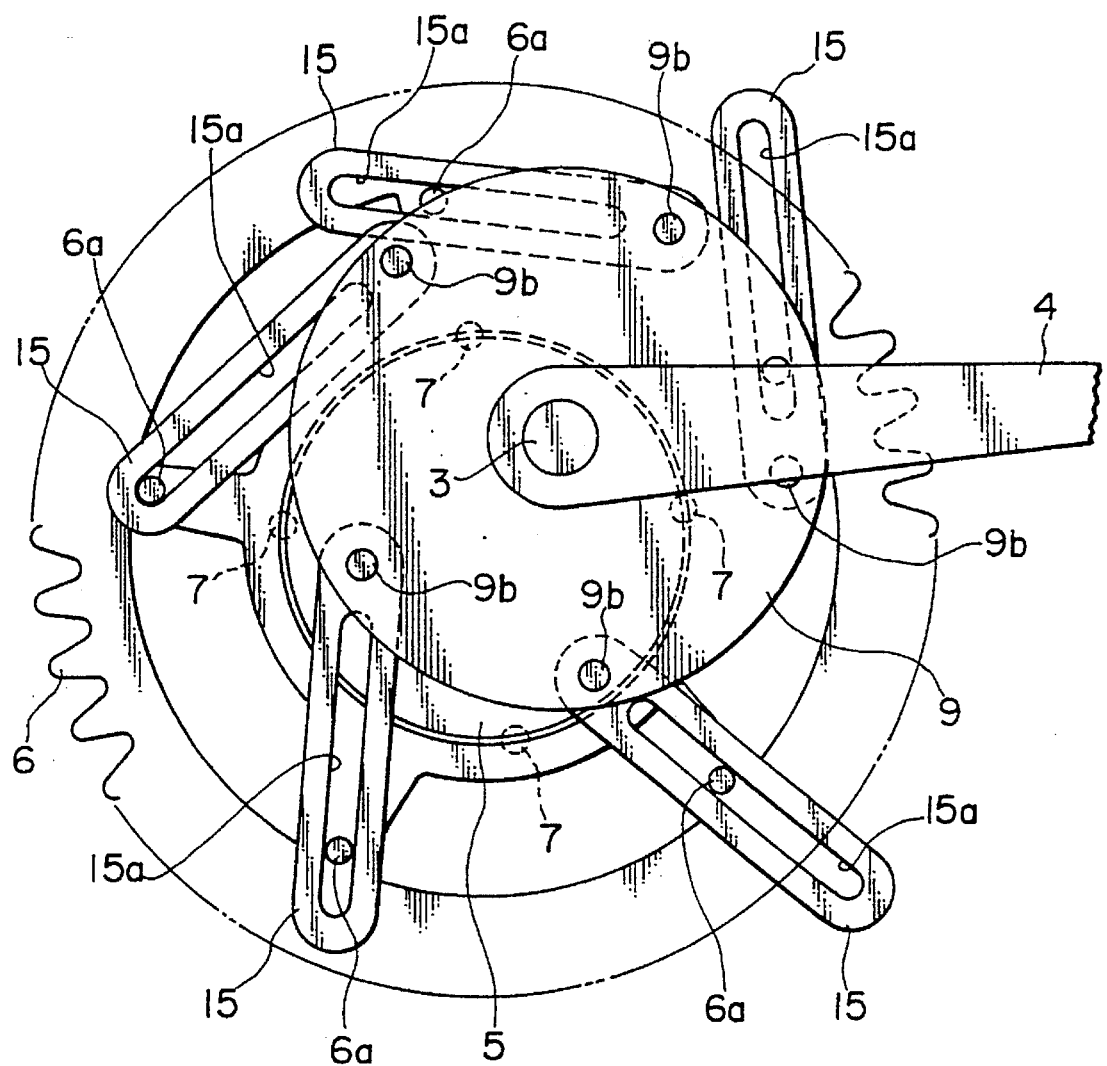
FIG. 5 is a plan view of the principal part of a traveling driving device for a bicycle, which is a third embodiment of the present invention.

FIG. 5 shows a third embodiment of the present invention.

The present embodiment is so constructed that rotation of the working plate 9 is transmitted to the chain wheel 6 by using five single type linking members 15. Each of these linking members 15 has a slit 15a and one extremity of the linking member is linked rotatably with the working plate 9 by means of a supporting pin 9b. Further a pin 6a disposed on the chain wheel is inserted into the slit 15a.

Also in the above construction, rotation of the working plate 9 is transmitted to the chain wheel 6 through the linking members 15. In the case of this construction neither springs nor stopper pins used in the first and second embodiments are necessary.

Figure 6:
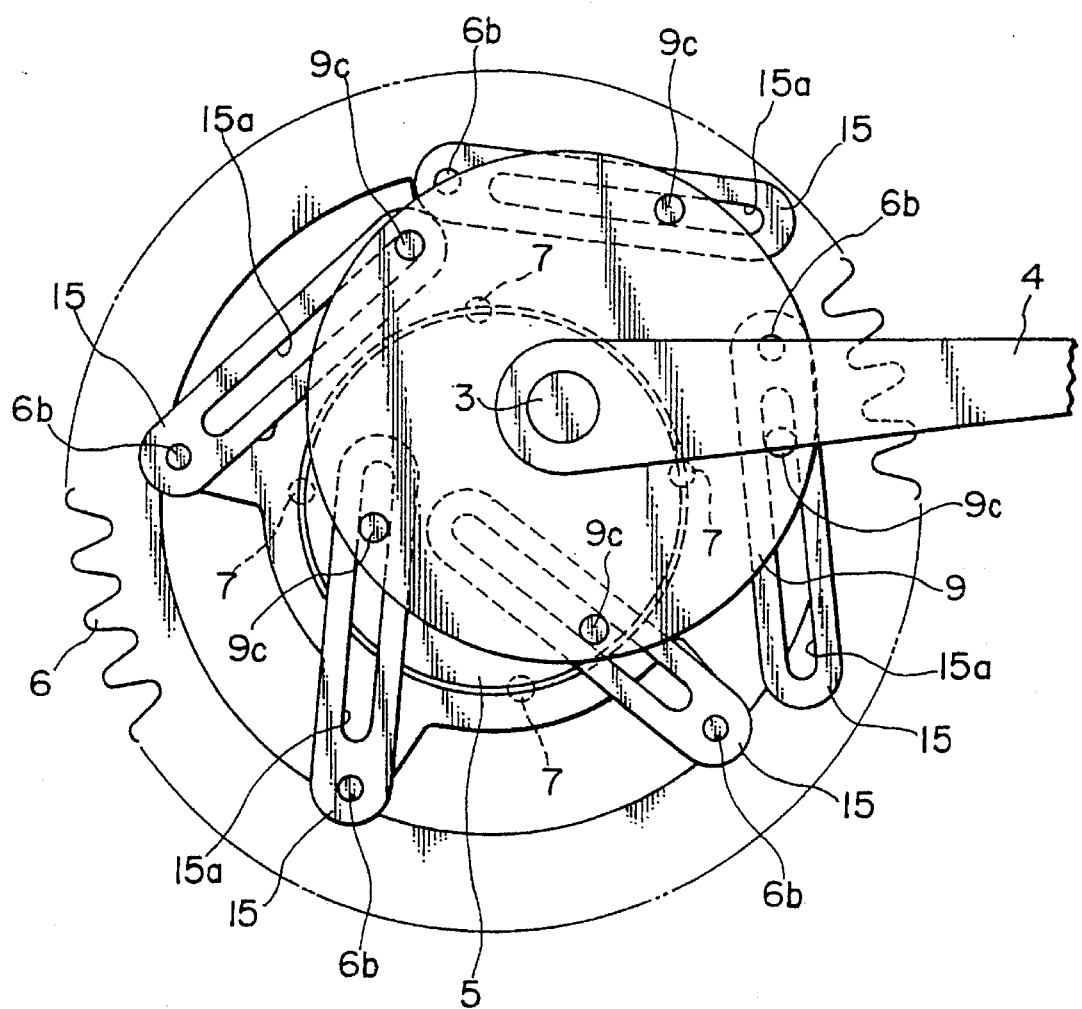
FIG. 6 is a plan view of the principal part of a traveling driving device for a bicycle, which is a fourth embodiment of the present invention.

FIG. 6 shows a fourth embodiment of the present invention.

In the present embodiment linking members 15 as described above are used. One extremity of each of them is supported on the chain wheel 6 by means of a pin 6b and a pin 9c disposed on the working plate 9 is inserted into the slit 15a. According to this construction, since no linking members 15 protrude outside of the chain wheel, it is not feared that they hinder movement of other members.

As described above, according to the present invention, it is possible to increase rotational torque of the chain wheel by pedaling the cranks.

What is claimed is:

1. An improved driving device for a bicycle, comprising:

a frame having a bearing portion thereon;

a rotating shaft mounted on said bearing portion;

a crank with a pedal mounted on each of two extremities of said rotating shaft;

an eccentric plate inserted between one of said cranks and said bearing portion, an outer perimeter of said eccentric plate being oriented eccentrically with respect to said rotating shaft and secured to said frame;

a chain wheel mounted rotatably on said outer perimeter of said eccentric plate;

a working plate secured to said rotating shaft and oriented between said one of said cranks and said eccentric plate;

a linking mechanism linking said working plate with said chain wheel and including a plurality of linking arms, each of said linking arms consisting of two linking members, one of said linking members being linked with said working plate while the other of said linking members is linked with said chain wheel;

a stopper pin disposed on said chain wheel so as to be engageable with one of said linking members for each of said linking arms in order to limit movement of said linking members to one predetermined direction from a dead point in a linking angle of said linking members; and a plurality of springs, each of which is linked with one of said linking members and said chain wheel.

2. An improved driving device for a bicycle, comprising:

a frame having a bearing portion thereon;

a rotating shaft mounted on said bearing portion;

a crank with a pedal mounted on each of two extremities of said rotating shaft;

an eccentric plate inserted between one of said cranks and said bearing portion, an outer perimeter of said eccentric plate being oriented eccentrically with respect to said rotating shaft and secured to said frame;

a chain wheel mounted rotatably on said outer perimeter of said eccentric plate;

a working plate secured to said rotating shaft and oriented between said one of said cranks and said eccentric plate;

a linking mechanism linking said working plate with said chain wheel and including a plurality of linking arms, each of said linking arms consisting of two linking members, one of said linking members being linked with said working plate while the other of said linking members is linked with said chain wheel; and a plurality of springs, each of which is linked with one of the linking members and the chain wheel in order to limit movement of said linking members to one predetermined direction from a dead point in a linking angle of said linking members of said link arms.

3. The improvement according to claim 1, wherein each of said springs has two arm portions and one roll-up portion therebetween, said roll-up portion being supported by a pin on said working plate, one of said arm portions being linked with said chain wheel, the other portion being linked with one of the linking members.

4. The improvement according to claim 2, wherein each of said springs has two arm portions and one roll-up portion therebetween, said roll-up portion being supported by a pin on said working plate, one of said arm portions being linked with said chain wheel, the other portion being linked with one of linking members.

5. An improved driving device for a bicycle, comprising:

a frame having a bearing portion thereon;

a rotating shaft mounted on said bearing portion;

a crank with a pedal mounted on each of two extremities of said rotating shaft;

an eccentric plate inserted between one of said cranks and said bearing portion, an outer perimeter of said eccentric plate being oriented eccentrically with respect to said rotating shaft and secured to said frame;

a chain wheel mounted rotatably on said outer perimeter of said eccentric plate;

a working plate secured to said rotating shaft and oriented between said one of said cranks and said eccentric plate;

a plurality of single type linking members, each of which has a slit therein, one extremity of each of said linking members being linked with said working plate; and a supporting pin disposed on said chain wheel being received into said slit.

6. The improvement according to claim 5, wherein said one extremity of each of said linking members is linked with said chain wheel, and said supporting pin is disposed on said working plate being received into said slit.

* * * * *